United States Patent Office 3,340,787
Patented Sept. 12, 1967

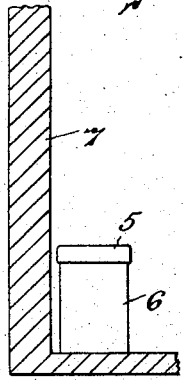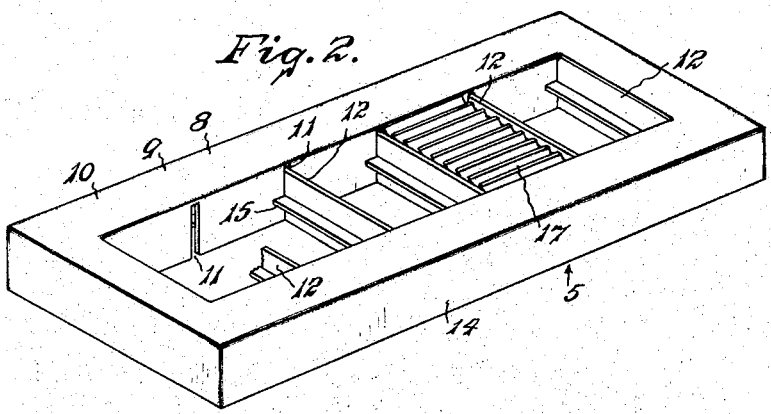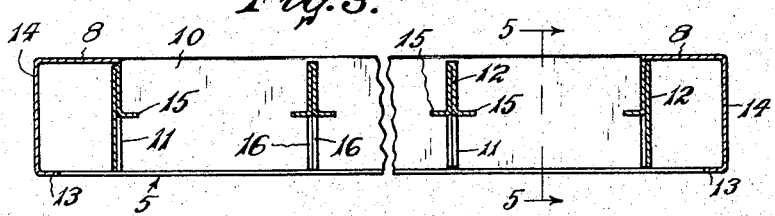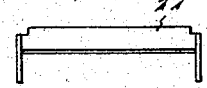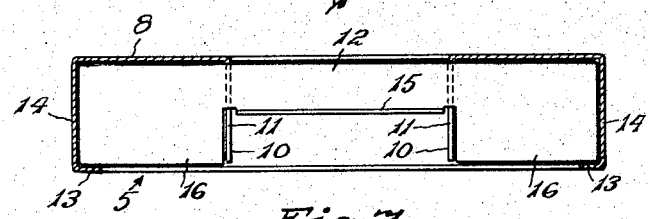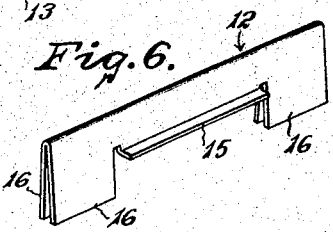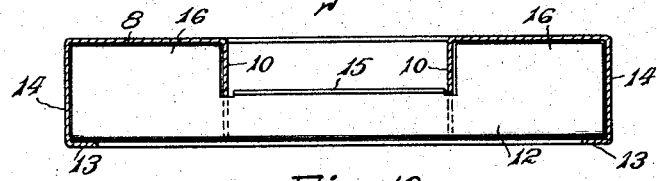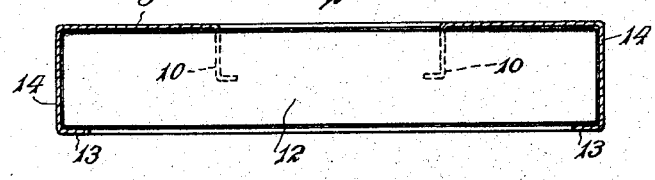

3,340,787
GRILLE FRAMES
Leonard R. Phillips, Hartford, Conn., assignor to Phillips Air Devices, Incorporated, Hartford, Conn., a corporation of Connecticut
Filed Jan. 5, 1965, Ser. No. 423,537
9 Claims. (Cl. 98—114)

This invention relates to improvements in grille frames and more particularly to the construction of frames for supporting the grilles of air conditioning apparatus and the like.

An object of this invention is to provide such a grille frame which is strong and durable in construction as well as economical to manufacture.

A further object is the provision of a grille frame having novel features of construction which may be incorporated in frames adapted for use with grilles of different types with very little change in the general construction of said frame.

A still further object is to provide a grille frame of a simple construction which will prevent rattles and vibration between the different parts thereof.

Further objects and advantages of this invention will be clearly understood from the following description and the accompanying drawings in which:

FIG. 1 is a partly sectional view of an installation illustrating the use of my improved grille frame.

FIG. 2 is an isometric view of said grille frame with parts thereof removed.

FIG. 3 is a side view thereof in central vertical section.

FIG. 4 is an end view of an air deflecting grille used in said frame.

FIG. 5 is a sectional view on line 5—5 of FIG. 3.

FIG. 6 is an isometric view of one of the novel supporting bars used in the construction of said grille frame.

FIG. 7 is a side view of said supporting bar.

FIG. 8 is an end view thereof.

FIG. 9 is a sectional end view showing a modified form of said grille frame.

FIG. 10 is a similar view showing a further modified form thereof.

As shown in the drawings, my present invention provides a grille frame 5 which is primarily intended for use on air conditioning ducts, such as shown in FIG. 1, wherein the said grille frame is mounted upon an air duct 6 that is usually located near a wall 7 of a building.

The said grille frame is preferably constructed of sheet metal and comprises a top wall 8 having an elongated opening 9 therein. At the opposite sides of said opening there are provided inner side walls 10—10 which are bent downwardly from the top wall along the sides of the opening and have opposed vertical slots 11—11 therein which receive elongated supporting bars 12, each of which is inserted into a pair of opposed slots and secured therein by inwardly bent flanges 13—13 along the bottom edges of the outer side walls 14—14 of said frame.

As shown, the said supporting bars 12 are formed of sheet metal bent double longitudinally to provide a spring, or yielding, fit in the slots 11—11, which will prevent rattles.

Each supporting bar 12 is formed to provide oppositely extending lateral grille supporting flanges 15—15, bent outwardly from the central portion thereof, and leg portion 16—16 at the opposite ends of said bar.

When installed into the frame 5, each supporting bar 12 supports the top wall 8, and the lateral flanges 15—15 are disposed within the opening 9 to support grilles 17, such as shown in FIGS. 2 and 4, which may be inserted in different positions in each square between adjacent supporting bars 12 to direct conditioned air in the desired direction.

In the modified form of frame shown in FIG. 9, the slots 11—11 are shorter and the supporting bars 12 are inserted therein in inverted position so that the bottom of the flanges 15—15 thereof will support an elongated grille, not shown, of the type which extends longitudinally in the opening 9.

In the further modified form shown in FIG. 10, the said supporting bars are constructed without the supporting flanges 15—15 and the bottom edges of the inner walls 10—10 are bent inwardly to support grilles, such as shown in FIGS. 2 and 4, in the squares between said supporting bars.

It will be understood from the above description that my improved grille frame may be modified to support different types of grilles without departing from the scope of my invention as set forth in the following claims.

I claim:

1. A grille frame constructed of sheet material and having a top wall, outer side walls depending from said top wall, an opening in said top wall, inner side walls for said opening depending from said top wall, said inner side walls having slots therein, supporting bars within said slots and supporting said top wall, supporting flanges bent inwardly from the bottom edges of said outer side walls and supporting said supporting bars and a grille supported by said supporting bars within said opening.

2. A grille frame constructed of sheet material and having a top wall, outer side walls bent downwardly from said top wall, an opening in said top wall having inner side walls bent downwardly from said top wall, said inner side walls having vertical slots therein open at the bottom of said inner side walls, supporting bars disposed within said slots and extending across said elongated opening, said supporting bars supporting said top wall, and inwardly bent flanges along the bottoms of said outer side walls for supporting said supporting bars and a grille within said opening supported by said supporting bars.

3. A grille frame as set forth in claim 2 wherein said supporting bars each have a grille supporting flange disposed within said elongated opening.

4. A grille frame as set forth in claim 2 wherein each of said supporting bars have grille supporting lateral flanges on opposite sides thereof disposed within said opening.

5. A grille frame of sheet metal having a top wall, outer side walls bent downwardly from said top wall, an opening in said top wall having inner side walls bent downwardly from said top wall, said inner side walls having vertical slots therein open at the bottoms of said inner side walls, supporting bars for said top wall disposed within said slot and extending across said opening between said outer side walls, and inwardly extending supporting flanges along the bottom edges of said outer side walls for supporting said supporting bars, said supporting bars being constructed of sheet metal bent double to provide yieldable normally diverging side portions closable to provide a snug spring fit for said supporting bars within said slots, supporting flanges on each of said side portions, a grille within said elongated opening supported by said flanges of the supporting bars, and inwardly extending flanges along the bottom of said outer side walls for supporting said supporting bars.

6. A grille frame constructed of sheet metal and having a top wall with an opening therein, outer side walls depending from said top wall, inner side walls depending from said top wall along the sides of said opening and having vertical slots therein, supporting bars for said top wall fitting within said slots and extending across said opening between said outer side walls, and inwardly bent flanges along the bottoms of said outer side walls for supporting said supporting bars, said supporting bars being constructed of sheet metal bent double to provide normally diverging side portions closable upon said supporting bars being inserted into said slots to provide a snug spring fit and a grille in said opening supported by said supporting bars.

7. The subject matter set forth in claim 6 wherein said supporting bars have a notch intermediate the end portions thereof and are inverted within said slots to dispose said notch within said elongated opening for receiving and supporting a grille in said opening with the bottom of said notch.

8. The subject matter set forth in claim 6 wherein said supporting bars have leg portions at the opposite ends thereof and an intermediate notch, and grille supporting flanges extending laterally from opposite sides of the bottom of said notch.

9. The subject matter set forth in claim 6 wherein said supporting bars have diverging yieldable side portions, each side portion having leg portions and an intermediate notch, and a grille supporting flange extending laterally from the bottom of said notch.

References Cited
UNITED STATES PATENTS

| | | | |
|---|---|---|---|
| 915,133 | 3/1909 | Waterbury | 98—114 |
| 1,348,360 | 8/1920 | Howell | 98—114 |
| 1,540,788 | 6/1925 | McClure | 98—114 |

ROBERT A. O'LEARY, *Primary Examiner.*

MEYER PERLIN, *Examiner.*

W. E. WAYNER, *Assistant Examiner.*